(12) United States Patent
Vikram Singh et al.

(10) Patent No.: US 12,282,688 B2
(45) Date of Patent: Apr. 22, 2025

(54) SYSTEMS AND METHODS FOR PROCESSING COMMANDS FOR STORAGE DEVICES

(71) Applicant: Samsung Electronics Co., Ltd., Suwon-si (KR)

(72) Inventors: Fnu Vikram Singh, Fremont, CA (US); Srinivasa Raju Nadakuditi, Bangalore (IN)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/224,523

(22) Filed: Jul. 20, 2023

(65) Prior Publication Data

US 2023/0359396 A1    Nov. 9, 2023

Related U.S. Application Data

(63) Continuation of application No. 17/024,598, filed on Sep. 17, 2020, now Pat. No. 11,733,918.

(Continued)

(51) Int. Cl.
    *G06F 3/06* (2006.01)

(52) U.S. Cl.
    CPC .......... *G06F 3/0659* (2013.01); *G06F 3/0604* (2013.01); *G06F 3/0679* (2013.01)

(58) Field of Classification Search
    CPC .... G06F 3/0659; G06F 3/0604; G06F 3/0679; G06F 3/0607; G06F 3/061; G06F 3/0658; G06F 3/0631; G06F 13/1642
    See application file for complete search history.

(56) References Cited

U.S. PATENT DOCUMENTS

| 8,966,164 B1 | 2/2015 | Asnaashari et al. |
| 10,452,279 B1 | 10/2019 | Malwankar et al. |

(Continued)

FOREIGN PATENT DOCUMENTS

| CN | 103176858 A | 6/2013 |
| JP | 2018-173959 A | 11/2018 |

OTHER PUBLICATIONS

EPO Office action dated Apr. 11, 2023, issued in European Patent Application No. 21178768.4 (11 pages).

(Continued)

*Primary Examiner* — Khoa D Doan
*Assistant Examiner* — Tong B. Vo
(74) *Attorney, Agent, or Firm* — Lewis Roca Rothgerber Christie LLP

(57) ABSTRACT

Methods and systems for processing a command from a host to a storage device are disclosed. A first controller of the storage device receives a first command from the host via a first queue. The first queue is exposed to the host. The storage device generates a second command based on the first command, and submits the second command to a second controller of the storage device via a second queue. The second command and the second queue are unexposed to the host. The second controller obtains and processes the second command from the second queue, where the processing of the second command is for accessing non-volatile storage media of the storage device. Based on a status of the second command, the first controller transmits a signal to the host for indicating completion of the first command.

20 Claims, 4 Drawing Sheets

Related U.S. Application Data

(60) Provisional application No. 63/057,720, filed on Jul. 28, 2020.

(56) References Cited

U.S. PATENT DOCUMENTS

| | | | |
|---|---|---|---|
| 2014/0189277 A1 | 7/2014 | Taki et al. | |
| 2014/0215129 A1 | 7/2014 | Kuzmin et al. | |
| 2015/0095554 A1 | 4/2015 | Asnaashari et al. | |
| 2015/0143038 A1 | 5/2015 | Asnaashari et al. | |
| 2015/0261434 A1 | 9/2015 | Kagan et al. | |
| 2016/0026388 A1 | 1/2016 | Jeong et al. | |
| 2017/0052901 A1 | 2/2017 | Seo et al. | |
| 2017/0123721 A1 | 5/2017 | Sela et al. | |
| 2017/0177541 A1 | 6/2017 | Berman et al. | |
| 2017/0192718 A1 | 7/2017 | Tsujimoto et al. | |
| 2017/0262176 A1 | 9/2017 | Kanno | |
| 2018/0069923 A1 | 3/2018 | Tsalmon | |
| 2018/0074708 A1 | 3/2018 | Gerhart et al. | |
| 2018/0260145 A1 | 9/2018 | Margetts | |
| 2018/0260152 A1 | 9/2018 | Bar et al. | |
| 2018/0284990 A1 | 10/2018 | Kachare et al. | |
| 2018/0285024 A1 | 10/2018 | Coleman et al. | |
| 2019/0058801 A1 | 2/2019 | Imamura et al. | |
| 2019/0079702 A1 | 3/2019 | Yeon et al. | |
| 2019/0095123 A1 | 3/2019 | Lin | |
| 2019/0155541 A1 | 5/2019 | Chan et al. | |
| 2019/0163364 A1 | 5/2019 | Gibb et al. | |
| 2019/0166201 A1* | 5/2019 | Choi | H04L 67/1097 |
| 2019/0187928 A1 | 6/2019 | Agarwal | |
| 2019/0235785 A1* | 8/2019 | Akers | G06F 3/0659 |
| 2019/0265909 A1* | 8/2019 | Frolikov | G06F 13/1642 |
| 2019/0278739 A1 | 9/2019 | Tamir et al. | |
| 2019/0294369 A1 | 9/2019 | Yun | |
| 2019/0377495 A1 | 12/2019 | Kim et al. | |
| 2020/0042177 A1 | 2/2020 | Benisty | |
| 2020/0050401 A1 | 2/2020 | Gibb et al. | |
| 2020/0050505 A1 | 2/2020 | Guo et al. | |
| 2020/0081659 A1 | 3/2020 | McGlaughlin et al. | |
| 2020/0089648 A1 | 3/2020 | Klein | |
| 2020/0104056 A1 | 4/2020 | Benisty et al. | |
| 2020/0176048 A1 | 6/2020 | Jin et al. | |
| 2020/0192792 A1* | 6/2020 | Cho | G06F 12/0646 |
| 2020/0301857 A1* | 9/2020 | Marks | G06F 13/4027 |
| 2020/0333975 A1* | 10/2020 | Benisty | G06F 3/0679 |
| 2020/0349068 A1* | 11/2020 | Kim | G06F 12/0238 |
| 2021/0042039 A1* | 2/2021 | Benisty | G06F 13/20 |
| 2021/0064289 A1* | 3/2021 | Kanno | G06F 3/064 |
| 2021/0191870 A1* | 6/2021 | Virani | G06F 12/0873 |
| 2021/0303199 A1 | 9/2021 | Horspool et al. | |
| 2021/0334205 A1* | 10/2021 | Balluchi | G06F 12/1063 |
| 2022/0011964 A1* | 1/2022 | Sasaki | G06F 3/0659 |
| 2023/0266915 A1* | 8/2023 | Sasaki | G06F 3/0611 |
| | | | 711/206 |

OTHER PUBLICATIONS

Office Action for U.S. Appl. No. 17/062,467 dated Nov. 15, 2022, 7 pages.
US Advisory Action dated Oct. 12, 2022, issued in U.S. Appl. No. 17/062,467 (2 pages).
US Notice of Allowance dated Feb. 27, 2023, issued in U.S. Appl. No. 17/062,467 (7 pages).
EPO Office action dated Aug. 3, 2022, issued in European Patent Application No. 21178768.4 (9 pages).
US Office Action dated Apr. 21, 2022, issued in U.S. Appl. No. 17/062,467 (8 pages).
Final Office Action for U.S. Appl. No. 17/062,467 dated Aug. 1, 2022, 13 pages.
NVM Express Base Specification, Revision 1.4a, Mar. 9, 2020, 405 pages, https://nvmexpress.org/wp-content/uploads/NVM-Express-1_4a-2020.03.09-Ratified.pdf.
Chinese Notification of Decision to Grant dated Jan. 2, 2024 for CN Application No. 202110850755.0, 7 pages.
Japanese Office Action dated Aug. 27, 2024, issued in corresponding Japanese Patent Application No. 2021-119943 (3 pages).

* cited by examiner

SYSTEMS AND METHODS FOR PROCESSING COMMANDS FOR STORAGE DEVICES

CROSS-REFERENCE TO RELATED APPLICATION(S)

The present application is a continuation of U.S. patent application Ser. No. 17/024,598, filed Sep. 17, 2020, now U.S. Pat. No. 11,733,918, which claims priority to and the benefit of U.S. Provisional Application No. 63/057,720, filed Jul. 28, 2020, entitled "METHOD TO SUBMIT AND PROCESS INTERNALLY GENERATED COMMANDS IN NVME STORAGE DEVICE," the entire content of which is incorporated herein by reference. This application is also related to U.S. application Ser. No. 17/062,467 filed Oct. 2, 2020, entitled "SYSTEMS AND METHODS FOR PROCESSING COPY COMMANDS", now U.S. Pat. No. 11,789,634, the content of which is incorporated herein by reference.

FIELD

One or more aspects of embodiments according to the present disclosure relate to storage devices, and more particularly to processing commands that are used for accessing the storage devices.

BACKGROUND

A host computing device may utilize a storage interface protocol to access a non-volatile storage device, such as, for example, a solid state drive (SSD). The non-volatile storage device may include a controller for processing a command that is generated using the protocol. As the protocol grows, more and more features (e.g. commands) may be added to the protocol. A legacy SSD may not be able to process the added features without having to redesign the SSD controller. Thus, it is desirable to have an SSD controller that is capable of processing commands from the host, without having to redesign the SSD controller, even when commands are added to the protocol.

SUMMARY

An embodiment of the present disclosure is directed to a method for processing a command from a host to a storage device. The method includes receiving, by a first controller of the storage device, a first command from the host via a first queue. The first queue is exposed to the host. The storage device generates a second command based on the first command, and submits the second command to a second controller of the storage device via a second queue. The second command and the second queue are unexposed to the host. The second controller obtains and processes the second command from the second queue, where the processing is for accessing non-volatile storage media of the storage device. Based on status of the second command, the first controller transmits a signal to the host for indicating completion of the first command.

According to one embodiment, the second command includes a portion of the first command.

According to one embodiment, the first command is associated with an operation and first and second memory ranges, where the second command includes the operation and the first memory range. The operation may comprise deallocating the first and second memory ranges. In one embodiment, the method further comprises generating, by the storage device, a third command including the operation and the second memory range; submitting, by the storage device, the third command to the second controller via the second queue; and obtaining and processing, by the second controller, the third command from the second queue. According to one embodiment, the transmitting by the first controller of the signal to the host for indicating completion of the first command, is based on status of the second command and status of the third command. The second and third commands may be obtained and processed concurrently.

According to one embodiment, the second command is different from the first command.

According to one embodiment, the storage device is a non-volatile storage device, the first controller and the second controller adhere to a non-volatile memory express (NVMe) protocol, the first queue comprises a submission queue adhering to the NVMe protocol, and the first command comprises an NVMe command.

According to one embodiment, the method further comprises submitting, by the second controller, a first completion status to a first completion queue, wherein the first completion queue is unexposed to the host.

According to one embodiment, the transmitting of the signal includes submitting a second completion status to a second completion queue based on processing the first completion status to the first completion queue, wherein the second completion queue is exposed to the host.

An embodiment of the present disclosure is also directed to a storage device that includes non-volatile storage media, and one or more processors coupled to the non-volatile storage media. The one or more processors may be configured to respectively: receive, via a first controller and first queue, a first command from the host, wherein the first queue is exposed to the host; generate a second command based on the first command; submit the second command to a second controller via a second queue, wherein the second command and the second queue are unexposed to the host; obtain and process, via the second controller, the second command from the second queue, wherein the one or more processors is further configured to access the non-volatile storage media of the storage device for processing the second command; and based on status of the second command, transmit, via the first controller, a signal to the host for indicating completion of the first command.

As a person of skill in the art should recognize, embodiments of the present disclosure allow the processing of commands and/or extensions without having to redesign a legacy storage controller. In addition, the separating of a host command into two or more internal commands that may be processed in parallel, may lead to better performance of the storage device and/or reduction in processing overhead.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
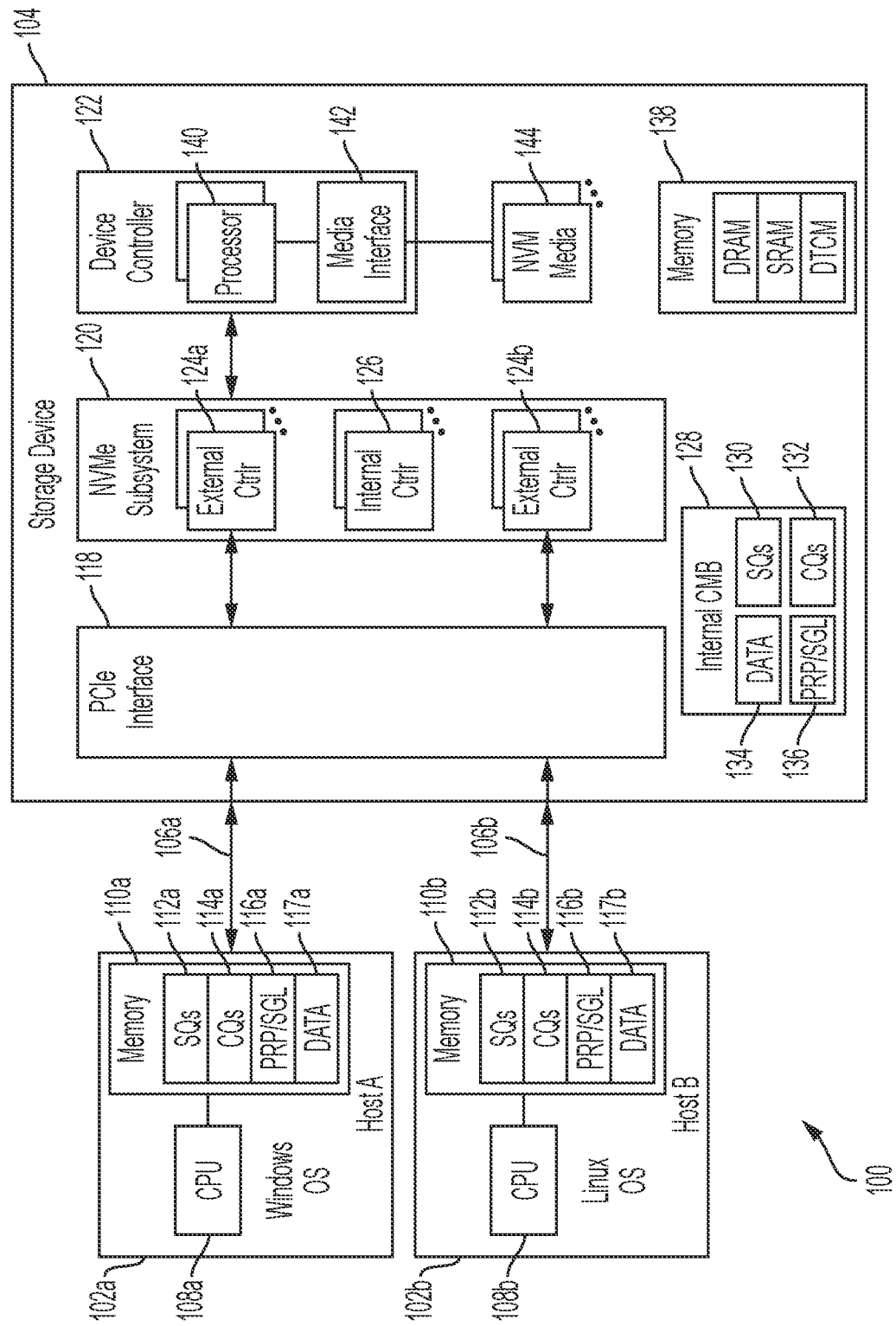
FIG. 1 is a block diagram of a data storage and retrieval system according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

A host computing device may utilize a communication protocol to access a non-volatile storage device, such as, for example, a solid state drive (SSD). The non-volatile storage device may include a controller for processing a command that is generated using the protocol. As the protocol grows, more and more features (e.g. commands) may be added to the protocol. A legacy SSD may not be able to process the added features without having to redesign the SSD controller. Thus, it is desirable to have an SSD controller that is capable of processing commands from the host, without having to redesign the SSD controller, even when commands are added to the protocol.

In general terms, embodiments of the present disclosure are directed to a storage device configured to process a command from a host, that adheres to a communication protocol. The communication protocol may be, for example, a non-volatile memory express (NVMe) protocol, although embodiments of the present disclosure are not limited thereto, and may extend to other protocols as will be appreciated by a person of skill in the art.

In one embodiment, the command from the host is decomposed into one or more internal commands for executing by the storage device. The storage device may include an internal controller configured to fetch and execute the one or more internal commands. In one embodiment, no communication path is set up between the host and the internal controller. Thus, the internal controller is not exposed to the host.

In one embodiment, the host submits the host command to an external submission queue exposed to the host, and associated with the storage device, using an interface such as, for example, an NVMe Interface. An external controller of the storage device may fetch/obtain the host command, and pass the fetched command to the storage device's processor for generating internal commands. The internal commands may be submitted to one or more internal submission queues. In one embodiment, the internal submission queues and the internal controller are unexposed (e.g. hidden) to the host.

The internal controller may fetch/obtain the internal commands, and dispatch them for execution by the processor as standard commands adhering to the communication protocol (e.g. NVMe protocol), or vendor specific commands, as if the commands were originating from the host. In one embodiment, the internal commands are fetched/obtained and executed concurrently with one another (e.g. in parallel) by the storage device. The terms concurrently and in parallel may mean at substantially the same time, at a rate that is faster than sequential processing, and/or the like.

FIG. 1 is a block diagram of a data storage and retrieval system 100 according to one embodiment. The system includes one or more host devices 102a-102b (collectively referenced as 102), configured with the same or different operating systems. The one or more host device 102 may be coupled to a data storage device 104 over a storage interface bus 106a, 106b (collectively referenced as 106). The storage interface bus 106 may be, for example, a Peripheral Component Interconnect Express (PCIe) bus. In one embodiment, the host devices 102 transfer and receive data from the data storage device 104 over the storage interface bus 106, using a storage interface protocol. The storage interface protocol may be the NVMe protocol as described in the Mar. 9, 2020, NVM Express base specification revision 1.4a (or prior or future revisions) available at http://nymexpress.org, the content of which is incorporated herein by reference. The NVMe protocol is used as an example for purposes of describing the present embodiments. A person of skill in the art should understand, however, that the various embodiments will extend to other current or future storage interface protocols similar to the NVMe protocol, without departing from the spirit and scope of the inventive concept.

The host 102 may be a computing device having a processor 108a, 108b (collectively referenced as 108) that is configured to process data. The processor 108 may be a general purpose central processing unit (CPU), application specific integrated circuit (ASIC), field programmable gate array (FPGA), or any other form of processing unit configured with software instructions, microcode, and/or firmware.

In one embodiment, the processor 108 is coupled to a host memory space 110a, 110b (collectively referenced as 110). The host memory space 110 may be a static random access memory (SRAM), dynamic random access memory (DRAM), and/or the like. An application program may be stored in the host memory space 110 for executing by the processor 108. The application may request storage or retrieval of data to and from the storage device 104. The application may generate an output based on the storing or retrieval of data. The output may be, for example, displaying retrieved data on a display device. In one embodiment, the use of internal commands by the storage device to process requests from the application allow the requests to be processed faster and with less overhead.

The host memory space 110 may also store one or more external submission queues (SQs) 112a, 112b (collectively referenced as 112), and one or more external completion queues (CQs) 114a, 114b (collectively referenced as 114). The host 102 may use the external submission queues 112 to submit storage interface commands for execution by the storage device 104, and use the external completion queues 114 to receive completion messages from the storage device 104 after the commands have been executed. In some embodiments, the external submission and completion queues 112, 114 are included in a controller memory buffer (CMB) of the storage device 104 instead of (or in addition to) the host memory space 110. Thus, a reference to the host memory space 110 may be understood to include a reference to the CMB. In either scenario, the external submission and completion queues 112, 114 are exposed to, and accessible by, the host.

In one embodiment, the host memory space 110 stores Physical Region Page (PRP)/Scatter Gather List (SGL) entries 116a, 116b (collectively referenced as 116) and other data 117a, 117b (collectively referenced as 117). For example, the PRP/SGL entries 116 may describe physical memory locations of the host memory space 110, for writing data read from the storage device 104 for an NVMe read command, and for reading data to be written to the storage device 104 for an NVMe write command. For certain storage interface commands, logical block address (LBA) ranges may be stored as data 117 in the host memory space, instead of including the ranges in the command itself. An example of such a command is a dataset management deallocate command, which may be used to deallocate/unmap the LBA ranges provided by the host.

The storage device 104 may be a non-volatile storage device such as, for example, a solid state drive (SSD). The storage device 104 may include a communications interface 118, NVMe subsystem 120, and device controller 122. Although the NVMe subsystem 120 and device controller 122 are depicted as separate modules, it should be understood that the functionality of the NVMe subsystem and the device controller 122 may also be incorporated as a single module. In one embodiment, the communications interface 118 includes PCIe ports and endpoints that enable ingress communications from the host 102 to the storage device 104, and egress of communications from the storage device 104 to the host 102.

The NVMe subsystem 120 may include, without limitation, one or more external controllers 124a, 124b (collectively referenced as 124) and one or more internal controllers 126. The external and internal controllers 124, 126 may be implemented via one or more processors such as, for example, an application-specific integrated circuit (ASIC). In one embodiment, the one or more external controllers 124 are exposed to the host via the PCIe interface 118, and are invoked for handling queue operations of the external submission and completion queues 112, 114. For example, a particular external controller 124 may fetch a storage interface command in a particular external submission queue 112, and place a completion status in the corresponding external completion queue 114 based on status of the requested command (e.g. indication that the requested command has been completed).

In one embodiment, a particular external controller 124 is associated with one or more of the namespaces. In this regard, the logical space of the storage device 104 may be split into the one or more logical spaces/namespaces, each namespace being identified by a unique namespace ID (NSID). For example, assuming a 1 TB storage device that uses 4K logical blocks, three namespaces may be allocated with the following capacity: 512 GB, 256 GB, and 256 GB. A command submitted by the host 102 may be directed to a specific namespace that is identified via the NSID.

In one embodiment, the one or more internal controllers 126 are unexposed to (e.g. hidden), and inaccessible by, the host 102. In this regard, no communication interface (e.g. PCIe interface) is provided between the host 102 and the internal controllers 126. The internal controller 126 may, according to one embodiment, mimic the functionality of the external controller 124. In this regard, the internal controller may interact with the device controller 122 as if it were an external controller 124.

In one embodiment, the storage device 104 includes an internal CMB 128 storing one or more internal submission queues 130, and one or more internal completion queues 132. The CMB 128 may store other data 134 (e.g. internal data buffers) and internal PRP/SGL entries 136. In one embodiment, the internal controller 126 accesses the internal CMB 128 for fetching and processing internal commands submitted by the device controller 122. The contents of the internal CMB 128, and the processing of the internal command, may be unexposed to (e.g. hidden), and inaccessible by, the host.

In one embodiment, the device controller 122 interacts with the external and internal controllers 124, 126 for executing commands requested by the host 102. The device controller 122 may include, without limitation, one or more processors 140 and media interface(s) 142. The one or more processors 140 may be configured to execute computer-readable instructions for processing commands to and from the external and internal controllers 124, 126, and for managing operations of the storage device 104. The computer-readable instructions executed by the one or more processors 140 may be, for example, firmware code.

In one example, the one or more processors 140 may be configured to interact with the external and internal controllers 124, 126 for receiving write or read commands to or from NVM media 144. The one or more processors 140 may interact with the NVM media 144 over the media interface 142 for effectuating the write or read actions. The NVM media 144 may include one or more types of non-volatile memory such as, for example, flash memory.

In one embodiment, the storage device 104 further includes an internal memory 138 for short-term storage or temporary memory during operation of the storage device 104. The internal memory 138 may include a DRAM (dynamic random access memory), SRAM (static random access memory), and/or DTCM (Data Tightly Coupled Memory). The internal memory 138 may be used in lieu or in addition to the internal CMB 128, to store some or all of the data stored in the internal CMB 128, such as, for example, the internal submission queues 130, completion queues 132, data 134, PRP/SGL entries 136, and/or the like. Thus, a reference to the internal CMB 128 may be understood to include a reference to the internal memory 138.

Figure 2:
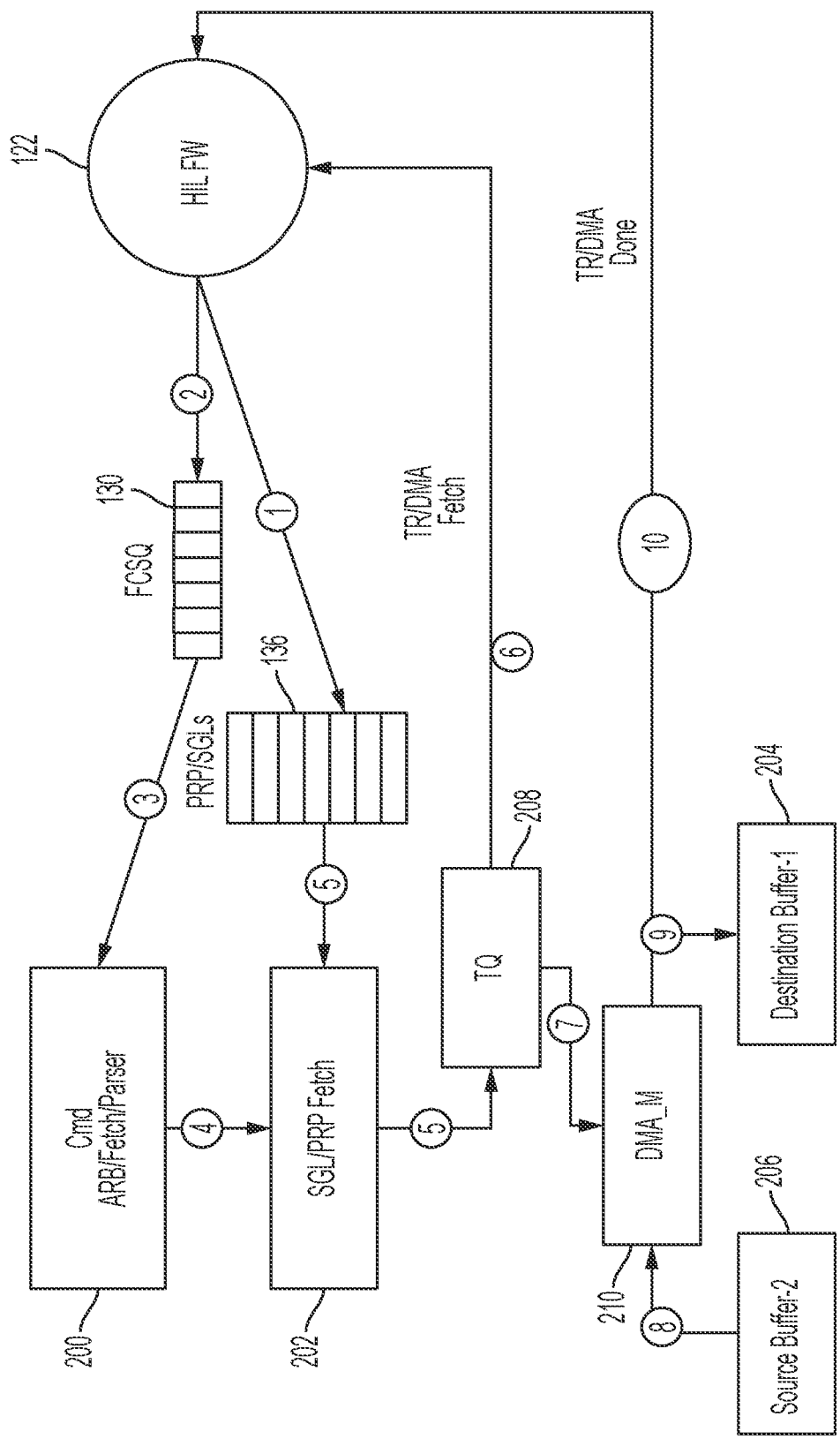
FIG. 2 is a conceptual layout diagram of various modules for submitting and processing commands associated with a storage communication protocol, or vendor defined commands, according to one embodiment.

FIG. 2 is a conceptual layout diagram of various modules for submitting and processing commands associated with a storage interface protocol, or vendor defined commands, according to one embodiment. The various modules may be hosted by the external and/or internal controllers 124, 126. Also, although one or more of the modules are assumed to be separate functional units, a person of skill in the art will recognize that the functionality of the modules may be combined or integrated into a single module, or further subdivided into further sub-modules without departing from the spirit and scope of the inventive concept.

In one embodiment, instances of a command module 200 and PRP/SGL fetch module 202 are included in both the external and internal controllers 124, 126. The command module 200 may include, for example, a command arbitration submodule, a command fetch submodule, a command parser submodule, and a command dispatcher submodule. The command fetch submodule may be configured to fetch a host command from the external submission queue 112, or an internal command from the internal submission queue 130. The command arbitration submodule may be configured to invoke an arbitration burst policy to arbitrate between various controllers, and between various submission queues of selected controllers, to pick a submission queue from which to fetch a command. The command parser submodule may be configured to parse a command submitted to the external or internal controller, for checking and verifying command format, NSID validity, reservation status, whether LBA checking is required or not, protection information validity based on the namespace format, and/or the like. The command parser submodule may also be configured to interface with an LBA overlap checker (not shown) to pass the command if LBA overlap checking is necessary for the command, based on programmed configuration information. The command parser submodule may also determine whether a command should be directly sent to the media interface, by-passing the host subsystem, for increasing system performance. The LBA overlap checker may be responsible for checking whether a host or internal command is currently being processed for the same range as with a newly arrived command. If the answer is yes, the LBA overlap checker may hold the newly arrived command until the previously fetched, and currently under-process command, completes. The command dispatcher hardware submodule may be responsible for distributing the commands to various processors based on the type of command (e.g. performance, non-performance, or administrative).

The SGL/PRP fetch module 202 may be configured to fetch PRP or SGL entries 116 from the host memory (in case of the external controller 124), or fetch PRP or SGL entries 136 from the internal CMB 128 (in case of the internal controller 126). In one embodiment, both the command module 200 and the SGL/PRP fetch module 202 adhere to the storage interface protocol in fetching commands and PRP/SGL entries, respectively.

In one embodiment, the host 102 submits a storage interface command to one of the external submission queues 112. The command module 200 (e.g. command fetch submodule) of one of the external controllers 124 fetches/obtains the command from the external submission queue 112, and passes the command to the device controller 122 for further processing. Depending on the type of command submitted by the host, the device controller 122 may access the host memory 110 for reading data 117 needed to process the fetched command, such as, for example, LBA ranges. In one embodiment, if the command submitted by the host 102 is a data transfer command, the SGL/PRP fetch module 202 associated with the external controller 124 may fetch the SGL/PRP entries 116 from the host memory 110 or CMB, for reading or writing the data associated with the data transfer command.

In one embodiment, the device controller 122 is configured to generate one or more internal commands based on the fetched command. The one or more internal commands may include a portion of the fetched command (e.g. an operation code in the fetched command). In one embodiment, the one or more internal commands are different from the fetched command. For example, the internal command may have an operation code different from the operation code in the fetched command.

The device controller 122 may submit the one or more internal commands to the internal submission queue 130, similar to the manner in which the host 102 submits NVMe commands to the external submission queue 112. For example, the device controller 122 may inform the command module 200 of the internal controller 126 that the one or more internal commands have been submitted, by updating a hardware doorbell register. In some cases, the command submitted by the host 102 may be broken into multiple internal commands. In one embodiment, the multiple internal commands are submitted and processed in concurrently with one another (e.g. in parallel) by the one or more internal controllers 126, allowing for increased performance of the storage device 104.

In one embodiment, if the internal command requires a data transfer, the SGL/PRP fetch module 202 of the internal controller 126 may fetch internal SGL/PRP entries 136 from the internal CMB 128, for reading or writing data associated with the internal command. The internal SGL/PRP entries 136 may be generated by the device controller 122. In one embodiment, for a read operation requiring a transfer from the NVM media 144, the internal SGL/PRP entries 136 may be for a destination buffer 204. For a write operation requiring a transfer to the NVM media 144, the internal SGL/PRP entries 136 may be for a source buffer 206.

In one embodiment, a transfer queue module 208 may be configured to process internal requests for transfer data to/from an intermediary buffer (not shown) based on a command type (e.g. read or write). For example, for internal read or write operations, the transfer queue module 208 may obtain information from the device controller 122 on certain data structures for controlling the direct memory access, including a transfer descriptor (TR) and a direct memory access (DMA) descriptor. The TR descriptor may contain a command type (e.g. read or write) for the data transfer. The DMA descriptor may contain information on the intermediary buffer for the command type. For example, if the command type is an internal read command, the intermediary buffer may be an intermediary read buffer used by the media interface 142 to temporarily hold data read from the NVM media 144. If the command type is an internal write command, the intermediary buffer may be an intermediary write buffer used by the media interface 142 to temporarily hold data to be written to the NVM media 144.

In one embodiment, a DMA manager module 210 receives the DMA descriptor as well as the SGL/PRP entries 136, and transfers data from the source buffer 206 to the NVM media 144 (via the intermediary buffer provided in the DMA descriptor) for an internal write operation, or from the NVM media (via the intermediary buffer provided in the DMA descriptor) to the destination buffer 204 for an internal read operation.

Figure 3:
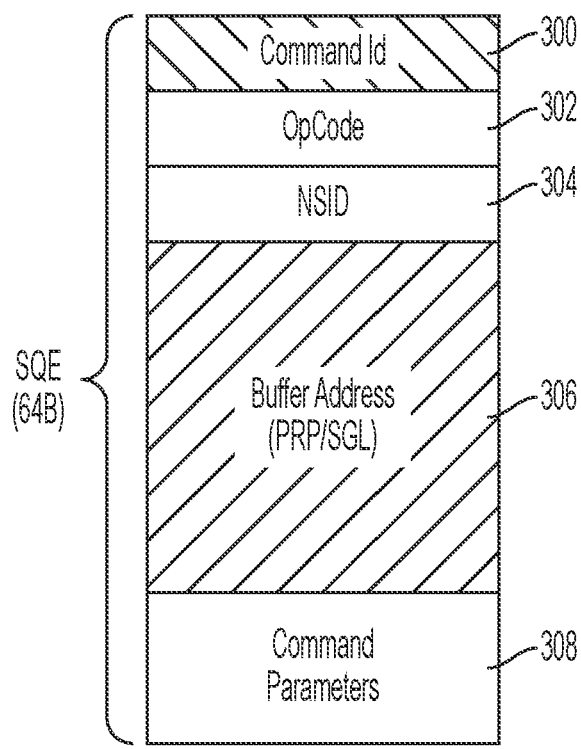
FIG. 3 is a layout block diagram of an internal command stored as a submission queue entry (SQE) in an internal submission queue according to one embodiment.

FIG. 3 is a layout block diagram of an internal command stored as a submission queue entry (SQE) in the internal submission queue 130 according to one embodiment. In one embodiment, the internal command is generated according to the storage interface protocol for generating external commands In this regard, the internal command may be 64 bytes in size, and may include a command identifier (ID) 300, operation code (OpCode) 302, namespace ID 304, buffer address 306, and command parameters 308. The command ID 300 may be a command ID within the internal submission queue 130 to which the internal command is submitted.

The OpCode 302 may identify a particular command that is to be executed. In one embodiment, the OpCode is an NVMe OpCode identifying an NVM command (e.g. write, read, administrative, dataset management, or vendor specific command). In some embodiments, the OpCode identifies a new command in an internal command set that is accessible to the internal controller 126 alone.

The namespace ID 304 may identify a namespace on which the command identified by the OPCode 302 operates. The buffer address 306 may include internal PRP/SGL entries 136 (or pointers to the PRP/SGL entries) in the internal CMB 128. Any parameter associated with the command to be executed may be stored as a command parameter 308.

Figure 4:
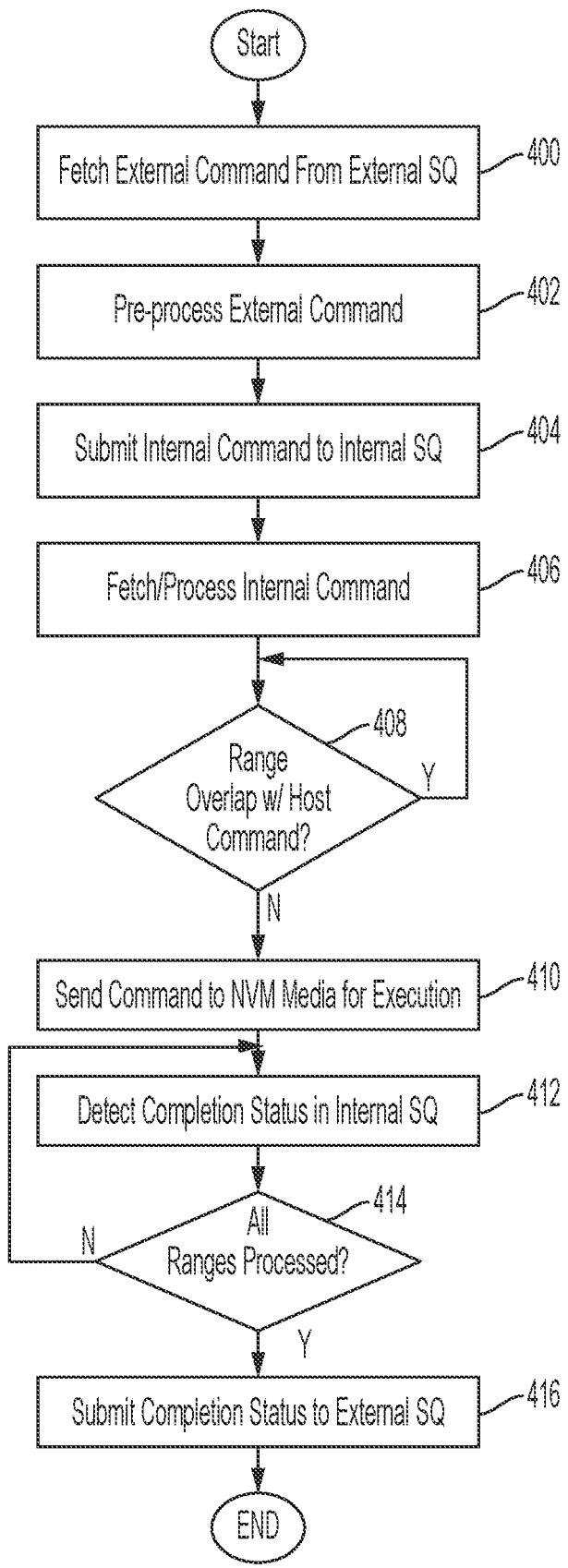
FIG. 4 is a flow diagram for processing a dataset management (DSM) command for deallocating (unmapping) a given set of logical block address ranges from a given namespace according to one embodiment.

FIG. 4 is a flow diagram for processing a dataset management (DSM) command submitted by the host 102 to the external submission queue 112, for deallocating (unmapping) a given set of LBA ranges from a given namespace according to one embodiment. The process starts, and in block 400, one of the external controllers 124 fetches the command from the external submission queue 112, and passes it to the device controller 122 for pre-processing by the processor 140.

In block 402, the processor 140 takes certain pre-processing actions including, for example, starting a host direct memory access operation over the storage interface bus 106, to transfer the LBA ranges from the host memory 110, to the storage device's internal memory 138. In addition, the processor 140 may parse the LBA ranges for identifying a total number of non-contiguous LBA ranges.

In block 404, the processor 140 generates an internal unmap command for each non-contiguous LBA range identified by the processor. In one embodiment, the unmap command is a command that is not part of the storage interface protocol. The processor 140 may submit the internal unmap command(s) to one or more of the internal submission queues 130.

The unmap command submitted for each LBA range is processed in blocks 406-412. Although the processing is described in relation to one unmap command for a single LBA range, it should be appreciated that other unmap commands submitted for other LBA ranges may be also be processed in parallel according to blocks 406-412.

In block 406, the internal controller 126 fetches and processes the unmap command from the internal submission queue 130. The command module 200 of the internal controller 126 may be invoked for fetching the unmap command from the internal submission queue 130. In one embodiment, given that the processing of the unmap command does not require a data transfer, the SGL/PRP fetch module 202 of the internal controller 126 is not invoked, and no internal PRP/SGL lists 136 are created.

In block 408, the internal controller 126 (e.g. LBA overlap checker) determines whether the LBA range in the internal unmap command overlaps with an LBA of a command that is being processed on behalf of the host 102. For example, the LBA range of the unmap command may overlap with an LBA address that is currently subject of a read operation by the host 102. If an overlap is detected, the internal controller 126 may wait until the host command is finished before proceeding with the unmapping of the LBA range.

If, however, no overlap is detected, the internal controller 126 transmits, in block 410, one or more commands to the media interface 142 via the device controller 122, for executing the actual unmap operation of the LBA range on the NVM media. It should be understood that the command parser submodule may also be invoked for performing other checks and verifications of the unmap command prior to delivering the one or more commands to the media interface 142, such as, for example, checking and verifying command format, NSID validity, reservation status, whether LBA checking is required or not, protection information validity based on the namespace format, and/or the like. Upon determining a completion status of the unmap operation, the internal controller 126 submits, in block 412, an internal completion entry to the internal completion queue 132 associated with the internal submission queue 130 where the internal unmap command was submitted.

In block 414, the processor 140 determines whether all LBA ranges of the submitted DSM deallocate command have been deallocated (e.g. based on status of the internal unmap commands). If the answer is YES, the external controller 124 submits, in block 416, an external completion entry to the external completion queue 114 corresponding to the external submission queue 112 to which the DSM deallocate command was submitted.

It should be appreciated that the processing of the DSM deallocate command according to an embodiment of the present disclosure provides technical improvements to the functioning of the data storage device 104. For example, parallel processing of LBA ranges due to the splitting of the DSM deallocate command into independent unmap commands, each with a separate LBA range, allows for better performance of the storage device. In addition, the checking of each LBA range for overlap (e.g. via hardware) reduces overhead of the processor 140, as manual locking and unlocking of the ranges may be avoided. In addition, in embodiments where the storage device includes two subsystems (e.g. a host subsystem for interacting with the hosts 102, and a flash subsystem for interacting with the NVM media 144), with dedicated processors (e.g. processor 140) executing firmware, the overhead of the host subsystem (e.g. firmware running on the processor 140) may be reduced, as the internal commands may be processed without much involvement of the host subsystem.

It should be appreciated that the one or more processors discussed above may be include, for example, application specific integrated circuits (ASICs), general purpose or special purpose central processing units (CPUs), digital signal processors (DSPs), graphics processing units (GPUs), and/or programmable logic devices such as field programmable gate arrays (FPGAs). In a processor, as used herein, each function may be performed by hardware, firmware, and/or software. A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for processing storage interface commands have been specifically described and illustrated herein, many modifications and variations will be apparent to those skilled in the art. Accordingly, it is to be understood that a system and method for processing storage interface commands constructed according to principles of this disclosure may be embodied other than as specifically described herein. The disclosure is also defined in the following claims, and equivalents thereof.

What is claimed is:

1. A method for processing a command, the method comprising:
    identifying, by a controller system of a storage device, a first command associated with an address in a non-volatile storage medium, wherein the first command is stored in a first queue by a computing device, wherein the first command is associated with first stored data;
    transmitting the first command by the controller system to a processor of the storage device based on retrieving the first command from the first queue;
    generating, by the processor of the storage device, a second command based on transmittal of the first command;
    storing, by the processor of the storage device, the second command in a second queue, wherein the second command is associated with second stored data different from the first stored data;
    retrieving, by the controller system of the storage device, the second command from the second queue for taking an action using the address;
    determining, by the storage device, a criterion associated with the address; and
    based on determining the criterion, taking, by the storage device, the action using the address.

2. The method of claim 1, wherein the second command includes at least a portion of the first command.

3. The method of claim 2, wherein the address includes a first memory range and a second memory range, wherein the second command is for the first memory range, the method further comprising:
    generating, by the storage device, a third command, wherein the third command is for the second memory range;
    storing, by the storage device, the third command in the second queue; and
    retrieving, by the storage device, the third command from the second queue for taking the action using the second memory range.

4. The method of claim 3, wherein the action comprises modifying access to the first memory range and the second memory range.

5. The method of claim 3, wherein identification of the first memory range and the second memory range is stored in a first memory of the computing device, the method further comprising:
    based on identifying the first command, retrieving the first memory range and the second memory range from the first memory of the computing device, and storing the first memory range and the second memory range into a second memory of the storage device.

6. The method of claim 1, wherein the criterion is based on a comparison of the address to a second address processed for the computing device.

7. The method of claim 1 further comprising:
    detecting a trigger, wherein the retrieving by the storage device the second command from the second queue is based on detecting the trigger.

8. The method of claim 1 further comprising:
    submitting, by the storage device, a first message to a third queue for indicating completion of the second command.

9. The method of claim 8 further comprising:
    submitting a second message to a fourth queue based on processing the first message in the third queue, wherein the fourth queue is configured for access by the computing device.

10. The method of claim 1, wherein the first stored data includes a first code associated with a first operation, and the second stored data includes a second code associated with a second operation.

11. A storage device comprising:
    a non-volatile storage medium;
    a first memory;
    one or more processors coupled to the first memory and the non-volatile storage medium, the one or more processors including a controller system and a device processor, the one or more processors being configured to respectively:
        identify by the controller system a first command associated with an address in the non-volatile storage medium, wherein the first command is configured to be stored in a first queue by a computing device, wherein the first command is associated with first stored data;

transmit the first command by the controller system to the device processor based on retrieving the first command from the first queue;

generate by the device processor a second command based on transmittal of the first command;

store by the device processor the second command in a second queue stored in the first memory, wherein the second command is associated with second stored data different from the first stored data;

retrieve by the controller system the second command from the second queue for taking an action using the address;

determine a criterion associated with the address; and based on determining the criterion, take the action using the address.

12. The storage device of claim 11, wherein the second command includes at least a portion of the first command.

13. The storage device of claim 12, wherein the address includes a first memory range and a second memory range, wherein the second command is for the first memory range, and wherein the one or more processors are further configured to:

generate a third command, wherein the third command is for the second memory range;

store the third command in the second queue; and retrieve the third command from the second queue for taking the action using the second memory range.

14. The storage device of claim 13, wherein the action comprises modifying access to the first memory range and the second memory range.

15. The storage device of claim 13, wherein identification of the first memory range and the second memory range is stored in a second memory of the computing device, wherein the one or more processors are further configured to:

based on identifying the first command, retrieve the first memory range and the second memory range from the second memory of the computing device, and store the first memory range and the second memory range into the first memory of the storage device.

16. The storage device of claim 11, wherein the criterion is based on a comparison of the address identified by the second command to a second address processed for the computing device.

17. The storage device of claim 11, wherein the one or more processors are respectively configured to retrieve the second command from the second queue based on detecting a trigger.

18. The storage device of claim 11, wherein the one or more processors are further configured to:

submit a first message to a third queue for indicating completion of the second command.

19. The storage device of claim 18, wherein the one or more processors are further configured to submit a second message to a fourth queue based on processing the first message in the third queue, wherein the fourth queue is configured for access by the computing device.

20. The storage device of claim 11, wherein the first stored data includes a first code associated with a first operation, and the second stored data includes a second code associated with a second operation.

* * * * *